Nov. 12, 1935.  R. C. MOORE  2,020,563
CONDENSATE REMOVING DEVICE
Filed June 21, 1933
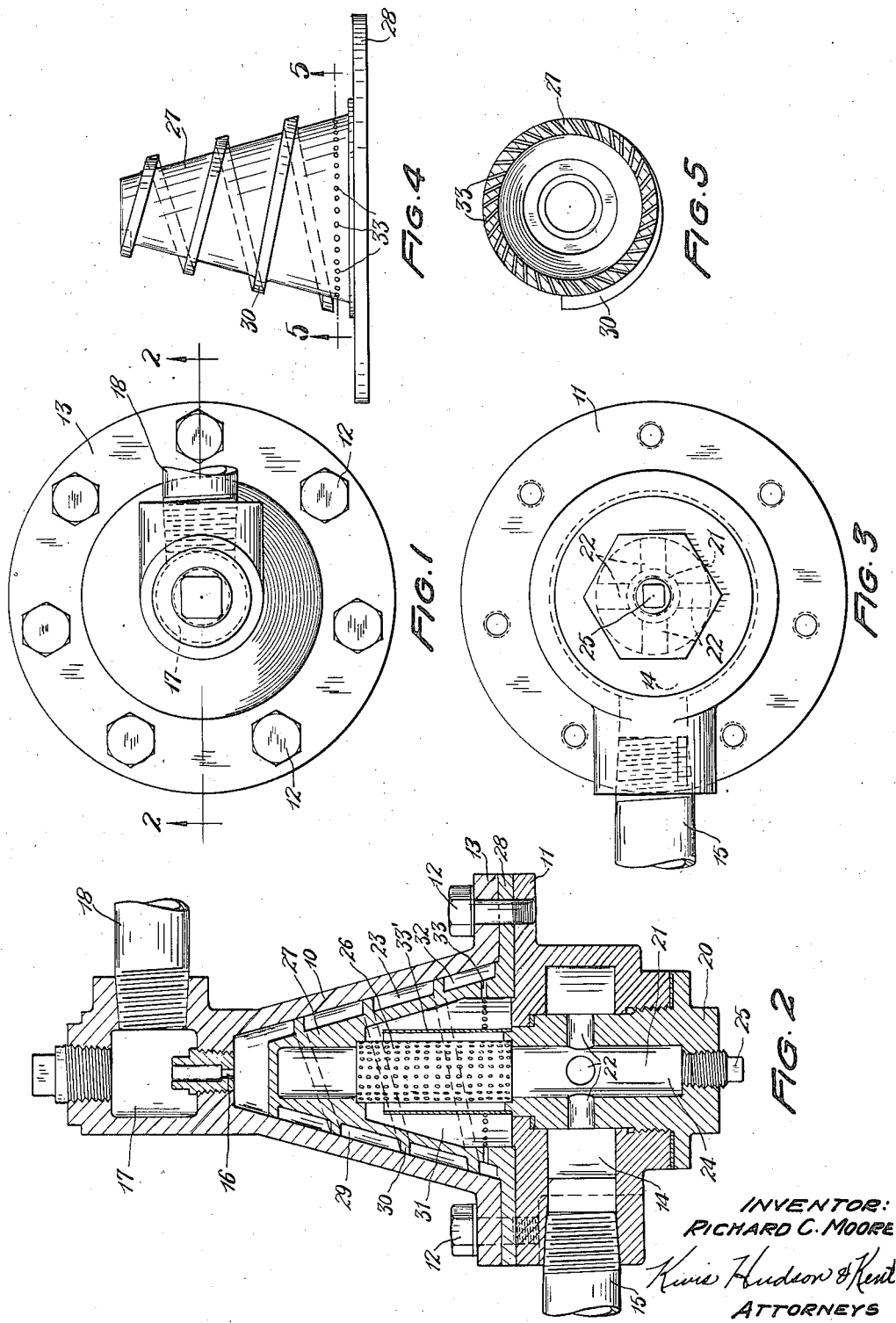
INVENTOR:
RICHARD C. MOORE
ATTORNEYS Patented Nov. 12, 1935

2,020,563

UNITED STATES PATENT OFFICE 2,020,563

CONDENSATE REMOVING DEVICE

Richard C. Moore, Painesville, Ohio, assignor to The Coe Manufacturing Company, Painesville, Ohio, a corporation of Ohio Application June 21, 1933, Serial No. 676,917

10 Claims. (Cl. 137—103)

This invention relates to apparatus for removing condensate from vapor or steam using equipment and, more particularly, to an improved condensate removing device which is of simple and economical construction and which performs the condensate removing function very effectively and with a minimum loss of vapor.

An object of the present invention is to provide an improved form of condensate removing device, of the type having a normally open discharge through which the condensate is forced, and wherein an automatic regulation of the flow of the condensate through the discharge is obtained, such that the device functions efficiently and with a minimum loss of vapor even though fluctuations occur in the rate at which the condensate is supplied to the device.

Another object of this invention is to provide an improved condensate removing device, of the type having a normally open discharge, wherein the vapor which enters the device with the condensate when the rate of condensate supply is less than the flow capacity of the discharge, is utilized for heating the condensate and thereby obtaining a regulating effect on the flow of condensate through the discharge.

A further object of this invention is to provide an improved condensate removing device having a normally open discharge and an inlet, which are located, respectively, at relatively high and relatively low points of the device and wherein means is provided intermediate the inlet and the normally open discharge for mixing vapor and condensate.

It is also an object of this invention to provide an improved condensation drainer having a substantially frusto-conical housing provided with a normally open discharge substantially at the apex of the housing and an inlet for condensate and vapor adjacent the base of the housing.

Yet another object of this invention is to provide a novel form of condensation drainer comprising a housing having a normally open discharge, and an inlet for condensate and vapor which communicates with the discharge through a baffled passage, and wherein means is provided for diffusing the vapor and causing the diffused vapor to pass into a body of condensate which is retained in immediately adjacent relation to the diffusing means.

Other objects and advantages of this invention will be apparent from the following description when taken in conjunction with the accompanying sheet of drawings wherein Fig. 1 is a top plan view of my improved condensation drainer.

Fig. 2 is a sectional elevation thereof taken substantially as indicated by line 2—2 of Fig. 1.

Fig. 3 is a bottom plan view of the device.

Fig. 4 is an elevational view showing a part of the mixing means in detached relation, and Fig. 5 is a sectional view taken as indicated by line 5—5 of Fig. 4.

Detailed reference will now be made to the accompanying drawing, wherein I have shown one form of the improved device which I have devised for removing condensate from vapor or steam using apparatus with a minimum waste of vapor. Although I have illustrated what I now regard to be the preferred form of my improved device, it should be understood, however, that the invention may be embodied in various other arrangements or apparatus.

In general, my improved condensate removing device is of the type having an inlet for the admission of condensate or condensate and vapor, under pressure, from vapor using apparatus, and a normally open discharge or orifice through which the condensate is forced by the vapor pressure, into a space of reduced pressure as compared with the pressure at the inlet.

As will be explained more fully hereinafter, the rate of flow of the condensate through the normally open discharge into the low pressure space is dependent upon the temperature of the condensate, and I utilize the vapor, which is supplied to the device, when the rate of condensate supply is low, for heating the condensate and thereby obtaining a regulation of the rate of flow through the normally open discharge, such that the loss of vapor is reduced to a minimum. My improved device is of simple and economical construction and is characterized by a complete absence of the intermittently operating valves and the moving parts embodied in the steam traps which have heretofore been in general usage.

Before entering into a detailed description of the construction and operation of my improved device, I wish to explain my interpretation of the action of the condensate in flowing through the normally open discharge or orifice into an outlet space or chamber of reduced pressure, since an understanding of this phenomenon is of importance in understanding the present invention. When hot condensate is forced through the orifice and into the low pressure space by the pressure of the vapor in the vapor using apparatus, the pressure on the condensate is suddenly reduced below the pressure necessary to maintain the hot condensate in liquid form and this reduction in pressure results in some of the hot condensate changing into vapor by the action commonly known as "flashing". Since the reduction in pressure on the condensate begins to take place in the orifice itself, the flashing into vapor likewise begins to take place at this point and the stream flowing through the orifice consists of a mixture of condensate and vapor bubbles. Since the density of the vapor is considerably less than that of the liquid in which the vapor bubbles are entrained, the rate of flow of hot condensate through the orifice is less than the rate of flow would be if the condensate were cold and contained no vapor bubbles.

From the foregoing explanation it readily follows that a decrease in the temperature of the condensate reduces the amount of flash vapor produced in the orifice and the mixture of vapor bubbles and condensate then consists of a larger proportion of condensate and a smaller proportion of bubbles. The result of the lowering of the temperature of the condensate is therefore that the flow capacity of the orifice is greater. For successive decreases or decrements in the temperature of the condensate, the rate of flow of condensate through the orifice is increased correspondingly until a maximum rate of flow is obtained when the condensate is cold. The rate of flow through the orifice increases rapidly at first, even for small temperature changes, when the temperature of the condensate is decreased below the vapor temperature corresponding with the pressure of the condensate, and the rate of flow increases gradually, though less rapidly with gradual decreases in the temperature until the maximum rate of flow through the orifice is obtained when the temperature of the condensate is below the boiling point corresponding with the pressure existing in the low pressure space into which the orifice discharges.

It is characteristic of vapor using apparatus that the temperature of the condensate produced by such apparatus varies in accordance with the rate at which the condensate is produced per unit area of condensing surface. That is to say, when condensate is produced by the apparatus at a relatively rapid rate per unit area, the temperature of the condensate will be relatively lower than the temperature of the vapor being supplied to the apparatus. If little condensate is being produced by the apparatus per unit area, the temperature of the condensate will be very close to, or only slightly below, the temperature of the vapor being supplied to the apparatus.

Assuming that my improved device having a normally open discharge orifice is connected to vapor using apparatus, it will be seen that when a relatively large volume of condensate is to be handled by the normally open discharge orifice, the temperature of the condensate is relatively low and the flow capacity of the orifice is relatively high for the cool condensate. When only a small quantity of condensate is being produced by the apparatus the condensate supplied to the orifice is of a higher temperature and the rate of flow of this relatively hot condensate through the orifice is lower, as explained above. Thus the characteristics of the flow of heated condensate through the orifice and the relation of the rate of flow to the decrement in temperature are such as to, in effect, increase the flow capacity of the orifice when the condensate is rapidly produced, and to decrease the flow capacity of the orifice when the condensate is more slowly produced.

When the condensate is produced at a relatively low rate by the vapor using apparatus, as explained above, vapor enters the condensation drainer with the reduced flow of condensate and if this vapor were permitted to flow through the normally open discharge, an undesirable waste of vapor would result. To utilize the above mentioned self regulating action of the orifice to greatest advantage so that the waste of vapor is reduced to a minimum, I utilize such vapor as is supplied to the device for heating the condensate. As will be presently explained, I accomplish this heating of the condensate by mixing the vapor with the condensate, and the increase in temperature of the condensate produced by this mixing results in a decrease or throttling of the flow through the orifice so that during the operation of the device the orifice is always discharging condensate at varying temperatures and at varying rates, and is never, or rarely ever, open for vapor to blow therethrough.

In the form of my improved condensation drainer which is shown in the drawing, I provide the device with a housing 10 which is preferably, though not necessarily, of substantially frusto-conical shape. The housing may be constructed of cast metal or any other suitable material which will withstand the pressures to which the device is to be subjected in the removal of condensate from vapor using apparatus. The housing may be closed at its base by means of a cover 11 which is removably secured to the housing by bolts or screws 12 extending through the flange 13. Adjacent the base of the housing, or in other words, at a relatively low point of the housing, I provide an inlet 14 for condensate or condensate and vapor and, in this instance, the inlet is formed in the cover 11. Vapor and condensate may be supplied to the inlet 14 by suitable piping 15 connecting the device with the vapor using apparatus. The housing is also provided at a relatively high point thereof with a normally open discharge preferably in the form of an orifice 16 opening into a reevaporation or discharge chamber 17, which is a space of low pressure as compared with the pressure existing in the inlet 14. Fluid in the chamber 17 may be discharged from the device through piping 18 which may lead to a feed tank, or to any other point where disposition of the condensate is to be made.

As shown in Fig. 2 of the drawing the cover 11 is provided with a removable plug member 20 which extends upwardly into the inlet opening 14. This plug member is provided with an axial opening or passage 21 which is connected with the inlet 14 through one or more laterally extending openings 22. The upper end of the passage 21 leads to the main chamber 23 of the housing and the lower portion of this passage provides a sediment chamber 24 from which sediment may be drained by the removal of the plug 25.

A combined screen and diffusing member 26 is provided in the housing between the inlet 14 and the normally open orifice 16 so that all of the vapor and condensate flowing through the housing must pass through this screen before it reaches the orifice. This screen may be of any suitable shape and may be arranged in the housing in any convenient manner, but in this instance is of tubular form and is arranged with its lower end supported on the plug member 20 and with its upper end engaging the baffle member 27 which is assembled in the housing.

The baffle member 27 is preferably of substantially frusto-conical shape so that it can be conveniently assembled into the main chamber 23 of the housing, and may be provided with an annular flange 28 which is adapted to be clamped between the cover 11 and the flange 13 of the housing for retaining the baffle member in proper position. This baffle member cooperates with the wall of the housing to provide a spiral or helical passage 29 leading toward the orifice 16. In this instance the helical passage is defined by a spiral fin 30 formed on the outer surface of the baffle member and engaging the inner surface of the wall of the housing, as shown in Fig. 2 of the drawing. The baffle member is hollow at the lower end thereof to provide a chamber 31 into which the screen 26 extends. The chamber 31 is connected with the lower convolution 32 of the spiral passage by means of an annular series of tangentially disposed or helical passages or openings 33.

From the arrangement as thus far described, it will be seen that condensate entering the device through the pipe 15 and the inlet 14 flows upwardly through the passage 21 of the plug member 20 into the tubular screen 26. Sediment or other foreign material removed from the condensate by the screen drops down into the sediment chamber 24 from which it can be drained by removal of the plug 25 as explained above. The condensate flows through the screen 26 into the chamber 31 and through the tangential passages 33 into the spiral passage 29. The arrangement of these tangential passages as shown in Figs. 4 and 5 is such as to impart to the condensate a whirling or rotating motion which initiates the travel of the condensate around the spiral passage 29. After the condensate flows upwardly through the spiral passage 29 it is forced through the orifice 16 and, as explained above, the hot condensate, or at least a part thereof, flashes into vapor and is discharged into the low pressure chamber 17 as vapor or as a mixture of vapor and condensate.

Since the inlet 14 is located at a relatively low point of the housing and the orifice 16 is located at a relatively high point of the housing, it will be seen that the inlet passages, the chamber 31, and the spiral passage 29 will be normally filled with condensate during the operation of the device. When the condensate is produced at a relatively low rate, as explained above, vapor enters the device with the condensate and I utilize this vapor to heat the condensate and thereby retard the flow through the orifice 16. In utilizing the vapor to heat the condensate it is desirable to cause the vapor to pass through or be mixed with the condensate, and to this end, I provide the tubular member 33' which is disposed around the diffusing screen 26 and which retains a body of the condensate in immediate surrounding relation to the screen. As shown in Fig. 2 of the drawing, this tubular member may be mounted on the plug member 20 so as to extend into the chamber 31 in substantially coaxial relation around the screen.

When vapor enters the device with the condensate the vapor passes through the openings of the screen 26 and is thereby diffused or broken up into small particles which pass into the condensate retained in immediate surrounding relation to the screen by the tubular member 33'. The mixture of vapor and condensate flows over the top edge of the tubular member 33' into the chamber 31 and then through the tangential or helical passages 33 into the spiral passage 29. During this flow of the vapor through the screen 26, the chamber 31, the passages 33, and the passage 29, the vapor and condensate are thoroughly mixed and the temperature of the condensate is thereby raised to substantially the same temperature as the vapor. Because of the increased temperature at which the vapor is supplied to the orifice 16 after such a mixing has taken place in the device, the flow of condensate through the orifice takes place at a decreased rate. This decreased rate of flow through the orifice causes condensate to be retained in the device throughout intervals when condensate is being produced at a relatively low rate by the vapor using apparatus. Thus in effect the flow capacity of the orifice 16 is decreased when the rate of production of condensate by the vapor using apparatus is relatively low.

When the rate, at which condensate is being produced by the vapor using apparatus, again increases so that this rate becomes equal to or greater than the flow capacity of the orifice, condensate tends to accumulate in the device and vapor is no longer supplied with the condensate. When this occurs the temperature of the condensate reaching the orifice 16 is again at a relatively low value and the rate of flow through the orifice is again increased. The varying of the rate of flow through the orifice in the manner explained takes place as a more or less regularly intermittent action and the admission of vapor into the device is dependent upon how nearly the rate of flow of condensate into the inlet opening approaches the minimum constant flow value of the hottest condensate through the orifice.

To obtain the most efficient operation of my condensation drainer it may be desirable, in some instances, to retard the radiation of heat from the device and this may be done by providing the body of the device with any suitable insulating material, such as a mineral wool, or by plating the material forming the body of the device with a bright finishing material, such as nickel.

If desired, the device may be provided with a sight glass on the exterior thereof which will indicate at all times whether or not the device is functioning and whether or not the device is functioning in the manner intended.

From the foregoing description and accompanying drawing it will now be understood that I have provided an improved form of condensation drainer, of the type having a normally open discharge, wherein an automatic regulation of the flow of condensate through the orifice is obtained, such that the effective flow capacity of the orifice is made to correspond substantially with the rate at which the condensate is being produced, with the result that loss of vapor through the orifice is reduced to a minimum. It will be understood, moreover, that in obtaining this self regulating action I utilize the vapor, which is supplied to the device when the rate of production of condensate is relatively low, for raising the temperature of the condensate to obtain the desired variation in the flow capacity of the orifice. The apparatus which I have devised is of very compact and simple construction and is characterized by a complete absence of intermittently operating valves or other moving parts which are subject to wear and require periodic replacement.

While I have illustrated and described the device of my invention in a detailed manner, it will be understood that I do not wish to be limited to the precise details of construction and arrangements of parts illustrated and described, but regard my invention as including such changes and modifications as do not involve a departure from the spirit of the invention and the scope of the appended claims.

Having thus described my invention, I claim:

1. In a condensation drainer the combination of a housing having an inlet for condensate and vapor, said housing also having an outlet and a normally open flow controlling orifice communicating with said outlet and through which the condensate is forced, and means associated with said inlet for mixing the condensate and vapor to thereby increase the temperature of the condensate, the last mentioned means comprising means for collecting condensate and a foraminous member for diffusing vapor into the collected condensate.

2. In a condensation drainer the combination of a housing having an inlet adapted to receive condensate and vapor under pressure and discharge means through which condensate is forced, said discharge means being such that the rate of flow of condensate therethrough decreases when the temperature of the condensate is increased, and means for utilizing vapor supplied to said inlet for increasing the temperature of the condensate to thereby retard the flow of condensate through said discharge means, the last mentioned means comprising means for collecting condensate and a foraminous member arranged to diffuse vapor into the collected condensate.

3. In a condensation drainer the combination of a housing having an inlet located at a relatively low point of the housing and adapted to receive condensate and vapor, a normally open flow controlling discharge orifice located at a relatively high point of the housing and through which the condensate is forced, and means in said housing between said inlet and discharge orifice, for mixing the vapor which is supplied to said inlet, with the condensate, the last mentioned means comprising substantially vertically disposed coextending hollow members having the walls thereof spaced to provide a circuitous fluid passage in which condensate is trapped and at least one of which members has relatively numerous openings for diffusing vapor into the trapped condensate.

4. A condensation drainer comprising a housing having an inlet for condensate and vapor and a normally open flow controlling discharge through which condensate is forced, said housing also having a chamber therein in communication with said inlet and said discharge such that condensate will be trapped in the chamber, a screen through which the vapor and condensate pass in entering said chamber, and means in said chamber for retaining trapped condensate in immediately adjacent contact relation to said screen whereby vapor passing through the screen is diffused into the trapped condensate.

5. A condensation drainer comprising a housing having an inlet for condensate and vapor and a normally open flow controlling discharge through which condensate is forced, said housing also having a chamber therein in communication with said inlet such that condensate is collected in said chamber, a screen through which the vapor and condensate pass in entering said chamber, means in said chamber for retaining some of the condensate in immediately adjacent contact relation to said screen whereby vapor passing through the screen is diffused into the collected condensate, and means providing a circuitous passage connecting said chamber with said normally open discharge.

6. A condensation drainer comprising a housing having an inlet for condensate and vapor and a normally open flow controlling discharge through which condensate is forced, said housing also having a chamber therein in communication with said inlet such that condensate is collected in said chamber, a screen through which the vapor and condensate pass in entering said chamber, means in said chamber for retaining some of the condensate in immediately adjacent contact relation to said screen and into which the vapor is diffused by the screen, and means providing a circuitous passage leading to said normally open discharge and a plurality of helical passages connecting the circuitous passage with said chamber.

7. A condensation drainer comprising a housing having a chamber therein and a normally open restricted discharge orifice communicating with the top of said chamber, a body extending into said chamber and having a recess in its lower end, means on the adjacent surfaces of said housing and body providing a circuitous passage the upper end of which communicates with said orifice and the lower end of which communicates with said recess, a cover for said housing having an inlet for condensate and vapor opening into the lower part of said recess whereby condensate is trapped in said recess, and a strainer for said inlet mounted on said cover and extending into said recess, said strainer being arranged for diffusing vapor into the collected condensate.

8. A condensation drainer comprising a housing having a chamber therein and a normally open restricted discharge orifice communicating with the top of said chamber, a body disposed in said chamber, said body having a recess in the lower end thereof, means on the adjacent surfaces of said housing and body providing a circuitous passage the upper end of which communicates with said orifice and the lower end of which communicates with said recess, a cover for said housing having an inlet for condensate and vapor opening into the lower part of said recess, a strainer for said inlet mounted on said cover and extending into said recess, and a sleeve on said cover projecting into said recess around said strainer for retaining condensate in immediate surrounding relation to said strainer.

9. A condensation drainer comprising a housing having a chamber therein and a normally open restricted discharge orifice communicating with the top of said chamber, a body disposed in said chamber and having a recess in the lower end thereof, means on the adjacent surfaces of said housing and body providing a circuitous passage communicating at the upper end thereof with said orifice and its lower end communicating with said recess, a cover for said housing having an inlet for condensate and vapor, a removable plug in said cover having a sediment chamber therein and a passage connecting said inlet and said sediment chamber with the bottom of said recess, and a strainer mounted on said plug above said sediment chamber and extending into said recess.

10. In a condensation drainer the combination of a housing having at a relatively high point thereof a normally open flow controlling discharge orifice through which condensate is forced, an inlet for condensate and vapor at a relatively low point of the housing, a condensate collecting chamber in said housing above said inlet, means providing a circuitous passage leading to said orifice from the lower portion of said collecting chamber, and means connecting said inlet with said collecting chamber, the last mentioned means being arranged to cause the vapor to be diffused into the collected condensate.

RICHARD C. MOORE.